A. W. PRATT.
STONE CUTTING MACHINE.
APPLICATION FILED MAY 28, 1912.
1,113,828.
Patented Oct. 13, 1914.
2 SHEETS—SHEET 1.
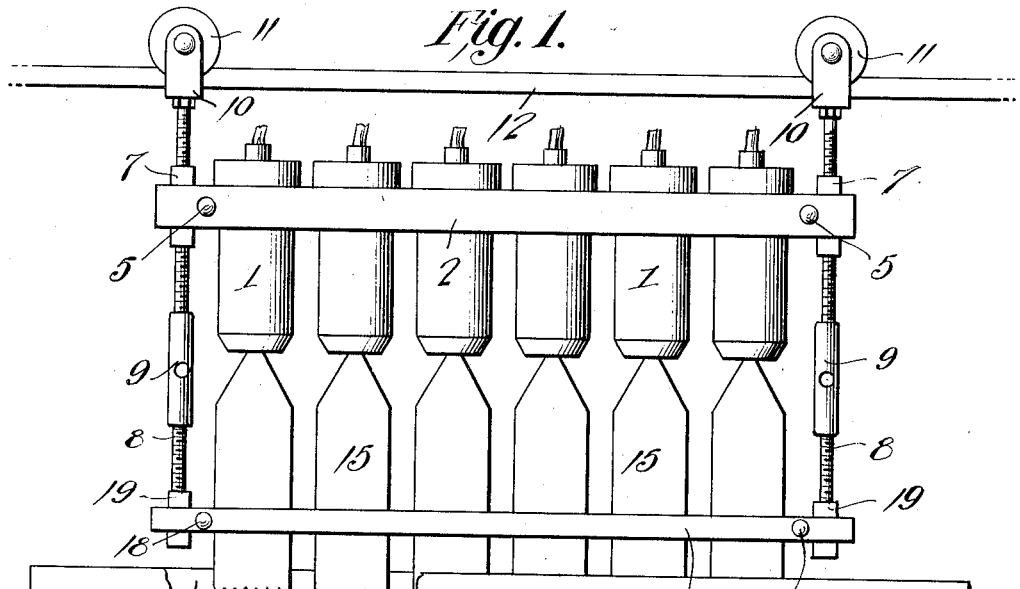
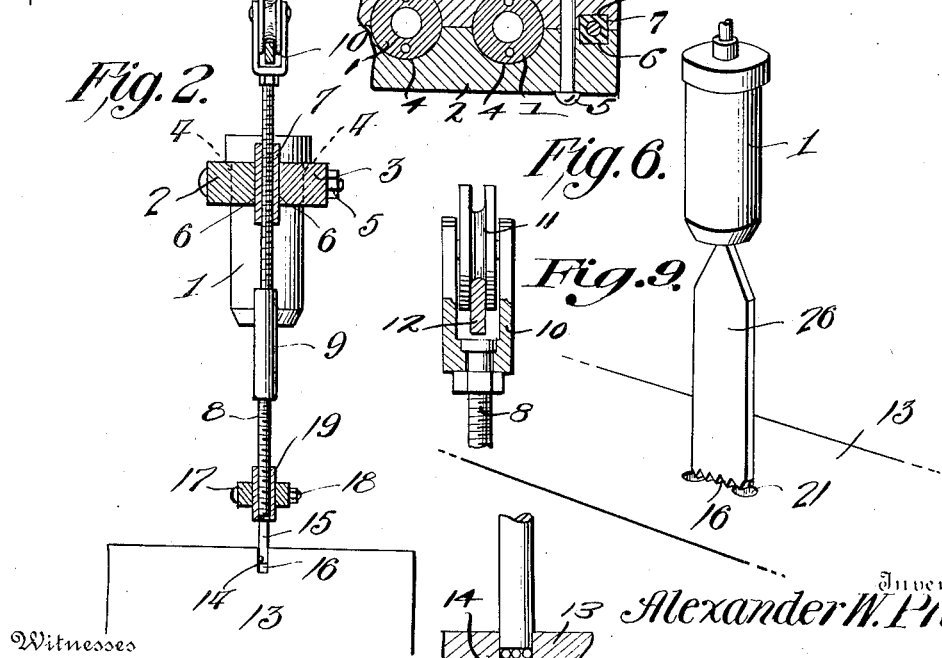
Witnesses
Carroll Bailey
P. M. Smith
Inventor
Alexander W. Pratt,
By Victor J. Evans
Attorney A. W. PRATT.
STONE CUTTING MACHINE.
APPLICATION FILED MAY 28, 1912.
1,113,828.
Patented Oct. 13, 1914.
2 SHEETS—SHEET 2.
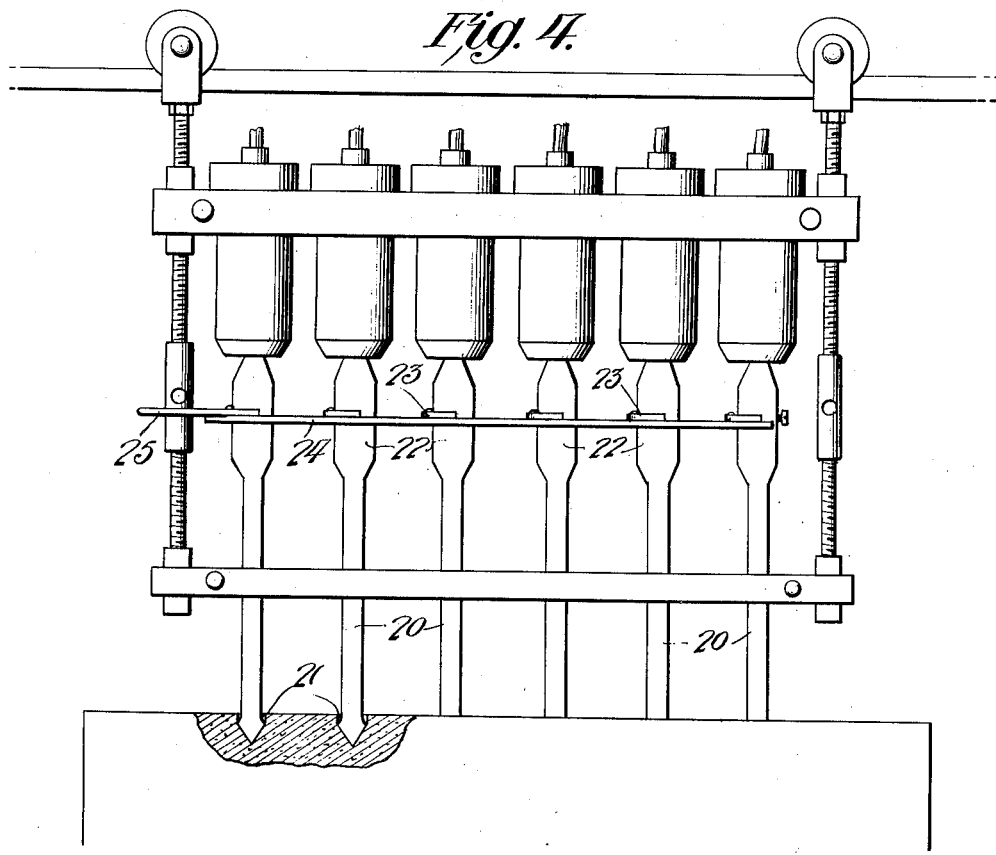
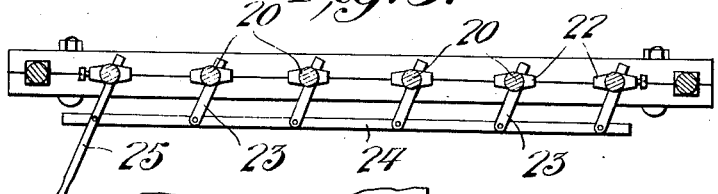
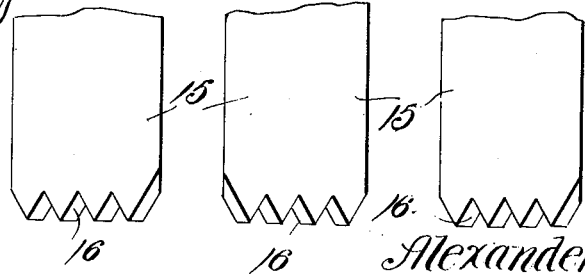
Witnesses
Garr. C. Bailey.
P. M. Smith.
Inventor
Alexander W. Pratt,
By Victor J. Evans
Attorney

UNITED STATES PATENT OFFICE.

ALEXANDER W. PRATT, OF NORTH JAY, MAINE.

STONE-CUTTING MACHINE.

1,113,828.  Specification of Letters Patent.  Patented Oct. 13, 1914.

Application filed May 28, 1912. Serial No. 700,304.

*To all whom it may concern:*

Be it known that I, ALEXANDER W. PRATT, a citizen of the United States, residing at North Jay, in the county of Franklin and State of Maine, have invented new and useful Improvements in Stone-Cutting Machines, of which the following is a specification.

This invention relates to stone cutting machines, the object of the invention being to provide a machine of the class referred to which will greatly facilitate and expedite the cutting of stone, either for the ordinary splitting purpose or for the formation of false joints, raggles, or notches, or for completely sawing the stone through; in fact the machine of this invention is designed for all classes of work to be performed on stone, as far as placing the same in marketable shape for transportation is concerned.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a front elevation of a stone cutting machine, embodying the present invention. Fig. 2 is a vertical cross section through the same. Fig. 3 is an edge view of several adjacently located cutters. Fig. 4 is a front elevation of the machine, showing different forms of cutting bits applied thereto. Fig. 5 is a horizontal section, showing means for oscillating the cutting bits. Fig. 6 is a detail view, illustrating the manner of cutting between the holes previously formed by the drill-shaped cutters. Fig. 7 is a section on the line 7—7 of Fig. 1. Fig. 8 is a detail section illustrating the employment of chilled shot in connection with the cutting bits. Fig. 9 is a detail section of the swivel joint between the screws and traveling hangers.

Referring to the drawings, I have therein illustrated a gang or series of pneumatic hammers 1, all of said hammers being arranged in a common plane and supported by means of a head yoke, comprising the parallel clamping members or bars 2 and 3, provided with concaved recesses 4 in their inner adjacent faces to form seats for the pneumatic hammers 1, and being securely fastened together by means of bolts 5.

It will be understood that any number of pneumatic hammers may be employed, and that the head yoke will be of corresponding dimensions and have a corresponding number of cavities or recesses to receive the pneumatic hammers.

The head yoke bars are further provided, adjacent their outer extremities and upon their inner adjacent faces, with square recesses or grooves 6 to receive internally threaded bushings or nuts 7 which are exteriorly square in cross section to fit in the recesses 6, thereby rendering said bushings capable of a limited amount of adjustment, in order to level up the head yoke in primarily setting the machine for operation, after the pneumatic hammers 1 have been clamped in the head yoke.

The head yoke 2, including the hammers carried thereby, is supported by means of a pair of feed screws 8, which are threaded through the bushings 7 and provided with suitable turnbuckles 9, by means of which the guide hereinafter described may be elevated and depressed to obtain the best results. Each of said feed screws 8 has a swivel connection at its upper extremity as shown in Fig. 9 with a hanger 10, forked to receive a wheel or pulley 11 traveling on the overhead rail or track 12. It will thus be seen that the head yoke is supported at two points upon the overhead rail 12, and said rail extends in a plane parallel to the row of pneumatic hammers, thus enabling the cutting bits carried by the hammers to move in a predetermined line or path over the stone being operated upon, the stone being illustrated at 13, while 14 designates a groove or channel being formed therein by the machine. The head yoke may also be raised and lowered relatively to the overhead bracket by turning the upper parts or sections of the screws 8 either independently of or together with the lower parts or sections of said screws and the turn buckles 9.

15 designates a series of cutting bits connected to the hammers and provided at their lower extremities with cutting teeth 16. At a suitable elevation above the work, there is arranged a guide formed by parallel bars 17 secured together, adjacent to their ends, by bolts 18, or the equivalent thereof. Bushings 19 are fastened between the clamping bars 17 of the guide and are internally threaded to receive the feed screws 8, whereby the guide is made adjustable up and down, so that it may be positioned close to the work. The cutting bits 15 are received between the clamping bars 17 of the guide which prevents lateral oscillation or variation of the cutting bits, and keeps them always in line with each other, and the groove or channel being formed in the work.

By reference to Fig. 3, it will be observed that the teeth 16 of one cutting bit are pitched or inclined reversely to the teeth of the adjacent cutting bits, at opposite sides thereof. This arrangement of cutting teeth, taken in connection with the back and forth sliding movement of all of the cutting bits on the overhead rail 12, will cause a combined cutting or hammering and sawing movement and operation upon the stone being cut, and will assure the formation of sharp and well-defined edges at each side of the channel.

Another plan of utilizing the machine is illustrated in Figs. 4 and 5, in which ordinary drill-shaped cutting bits 20 are shown, adapted to form a row of holes 21 in the stone. Adjacent to its base, each of said drills is preferably expanded or widened, as shown at 22, and provided with a projecting lever arm 23. All of these lever arms 23 are connected to a common operating rod or bar 24, actuated by means of a suitable handle or lever 25 which may constitute a continuation of one end of the lever arms 23, as shown. Thus as the cutting bits are moved up and down, they may be manually oscillated at the same time by an attendant standing near the machine, thereby greatly facilitating the cutting of the holes in the stone. After the holes have been formed of the requisite depth, a cutting tool 26 illustrated in Fig. 6 may be employed for channeling out the stone between the holes 21 formed therein, or the cutting bits 20 may be removed and the machine supplied with the cutting bits 15 illustrated in Fig. 1, and the material between the holes 21 may then be removed by vertical operation alone, or both vertical and horizontal movement of the cutting bits 15, as previously described.

It is also within the scope of this invention to use, in connection with the operating mechanism of the machine, a series of bits 27 having square or rounded extremities 28, and employing chilled iron or steel shot 29, which will be placed in the channel, so as to be operated upon by the extremities of the bits which will act to drive the steel shot down into the stone, thereby gradually cutting the channel. The back and forth or sawing movement of the bits may also be resorted to, to expedite the cutting operation, when the steel shot are employed.

What is claimed is:

1. In a stone cutting machine, the combination of an overhead track rail, a head yoke, a gang of pneumatic hammers carried thereby and arranged in a common plane, rollers supporting said yoke on the overhead track and permitting the yoke to be shifted along said rail in the plane in which the hammers are arranged, and screws for elevating and depressing said head yoke relatively to the overhead track rail.

2. In a stone cutting machine, the combination of an overhead track rail, a head yoke suspended therefrom and movable along the same, a gang of pneumatic hammers and cutting bits carried by said yoke and arranged in a common plane, and an adjustable guide for the cutting bits connected with and shiftable toward and away from the yoke.

3. In a stone cutting machine, the combination of an overhead track rail, a head yoke suspended therefrom and movable along the same, a gang of pneumatic hammers and cutting bits carried by said yoke and arranged in a common plane, means supporting said yoke and permitting the same to be shifted lengthwise, a guide for said cutting bits, and screws located at opposite ends of the gang of hammers for adjusting said guide toward and away from the work.

4. In a stone cutting machine, the combination of a head yoke, a gang of pneumatic hammers carried thereby and arranged in a common plane, cutting bits carried by said hammers, and a common operating bar operatively connected with all of said bits and adapted to simultaneously oscillate said cutting bits on their longitudinal axes.

5. In a stone cutting machine, the combination of a head yoke, a gang of pneumatic hammers carried thereby and arranged in a common plane, cutting bits carried by said hammers, lever arms on said cutting bits, and a connecting rod common to all of said lever arms, whereby the bits may be oscillated on their longitudinal axes.

In testimony whereof I affix my signature in presence of two witnesses.

ALEXANDER W. PRATT.

Witnesses:
JOHN GRANT,
JOHN STANSFIELD.